United States Patent [19]

Mays

[11] 4,304,336

[45] Dec. 8, 1981

[54] INTERCHANGEABLE GLASS RACK FOR PICKUP TRUCKS

[76] Inventor: Calvin B. Mays, 1717 Red Bluff, Pasadena, Tex. 77506

[21] Appl. No.: 125,324

[22] Filed: Feb. 28, 1980

[51] Int. Cl.³ .............................................. A47G 19/08
[52] U.S. Cl. ........................................ 211/41; 296/3; 224/273
[58] Field of Search .............. 211/41; 296/3; 224/273, 224/314, 325

[56] References Cited

U.S. PATENT DOCUMENTS

| | | | |
|---|---|---|---|
| 2,518,624 | 8/1950 | Kraft | 296/3 X |
| 3,217,449 | 11/1965 | Levere | 224/273 |
| 3,365,230 | 1/1968 | Langdon | 296/3 |
| 3,424,487 | 1/1969 | Pector et al. | 296/3 |
| 3,765,713 | 10/1973 | Suitt | 296/3 |
| 3,937,329 | 2/1976 | Hammerel | 211/41 |

*Primary Examiner*—Francis K. Zugel
*Attorney, Agent, or Firm*—Gunn, Lee & Jackson

[57] ABSTRACT

The preferred embodiment discloses a rack for transporting heavy plate glass, said rack being designed to be removably mounted on any General Motors, Chrysler or Ford pickup truck. The rack is composed of two upstanding rows of A-frames, one positioned over each side panel of the bed of a pickup truck. Each row of upstanding A-frames is a rigidly connected integral unit. Horizontal support members, typically formed of square tubing, are permanently affixed to the base and apex of the A-frame. When assembled, each row of A-frames is positioned over the side panel of a pickup truck and stabilized in an upright fashion by stakes which plug into receptacles provided in the side panel of a pickup truck. In addition to the stakes, an adjustable horizontal jack is extended from the base of the A-frame to the interior wall of the side panel of a pickup truck to provide additional support. The distance between the two rows of A-frames is spanned by a series of elevated horizontal support beams, typically constructed of square tubing, which are removably connected to the rows of A-frames. The glass rack thus disclosed can be easily disassembled by removing the elevated horizontal beams and loosening the jacks, allowing removal of the rigidly connected A-frames from the bed of the pickup truck and transfer to another truck or to storage without the necessity of cutting torches, saws or welding machines.

7 Claims, 4 Drawing Figures

INTERCHANGEABLE GLASS RACK FOR PICKUP TRUCKS

BACKGROUND OF THE INVENTION

This invention is directed to a rack for transporting plate glass, said rack being removably mounted on the back of a pickup truck. A pickup truck, being a small truck, is normally used to deliver sheet glass on short trips. Large trucks, freight cars and other enclosed carriers are normally used to haul sheet glass on long trips. Convenience in warehouse handling and truck loading normally requires unwrapping so individual sheets are handled on local deliveries. The rack of this disclosure does not encase the glass, but conveniently mounts the panel for easy removal. Protection of the glass which can be obtained from a shipping container or inside a covered vehicle is less important than ease of loading and unloading. For these reasons, this type of rack is typically used to transport plate glass for short distances, for example, from a point of supply to a construction site in the same local area. This type of rack is not used for long hauls, for example, from New York to Miami.

Other racks used in the glass industry are mounted on small trucks, pickup trucks or are completely enclosed inside of a delivery vehicle. Conventional racks are permanently affixed to the aforementioned vehicles and cannot be removed without substantial damage to either the vehicle or the rack, itself. Another problem with conventional racks is their lack of stability. When loading or unloading heavy glass onto a conventional rack, inevitably, one side will be more heavily loaded than the other side of the rack. In this situation, tremendous forces are exerted on one side of a conventional rack with no offsetting forces being applied on the unloaded side. In this type of situation, the rack must have substantial cross-bracing of a horizontal and vertical nature to prevent the entire apparatus from toppling over under the weight of heavy plate glass. This leads to a relatively clumsy, overbuilt rack on the truck.

When both sides of the truck are evenly loaded, the forces tend to balance one another and thus stabilize the rack. However, this good fortune cannot always be obtained. When only one side is loaded, the forces become imbalanced and are overcome only with excessive structure and cost. This apparatus has as one feature a glass rack which is permanently affixed by horizontal and vertical supports to the vehicle and, yet, supports the unbalanced load. The apparatus features a rack installation which transfers unbalanced loads.

BRIEF SUMMARY OF THE INVENTION

The present invention discloses a glass rack which has unique balancing features which overcome the problems associated with conventional racks, eliminating the need for excessive structural support or permanent attachment to the delivery vehicle. The balancing of forces that is achieved by this rack allows it to be constructed in a lightweight and removable fashion which is clearly an advancement over the prior art. This also allows the frame to be mass produced out of a single stock of square tubing stock which weighs less and is cheaper to manufacture than conventional glass racks. Although the preferred embodiment is made of a single stock of square tubing, the rack can be constructed of different sizes of square tubing, pipe, wood or any combination of conventional rigid materials. If the present invention is excessively loaded on one side of a truck, the downward weight of the glass is transferred from the loaded side of the truck through elevated horizontal beams to the set of A-frames on the opposite side of the truck, the A-frames including a jack which presses against the opposite interior side panel of the pickup truck. As a result, the torque of the heavy plate glass is transferred from the rack supporting the glass to the opposite interior wall of the pickup truck. This transfer of forces from one side to the other of the truck results in a balancing which is not accomplished by conventional, rigidly attached racks. The conventional racks obtain the preponderance of their upright support from rigid attachments to the bumper, frame and other structural members of the vehicle. The conventional racks simply do not transfer the preponderance of the downward forces of the heavy plate glass from one side of the rack to the other to balance the load. A distinctly undesirable alternative is welding the entire structure to the truck body.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE ILLUSTRATED EMBODIMENT

Figure 1:
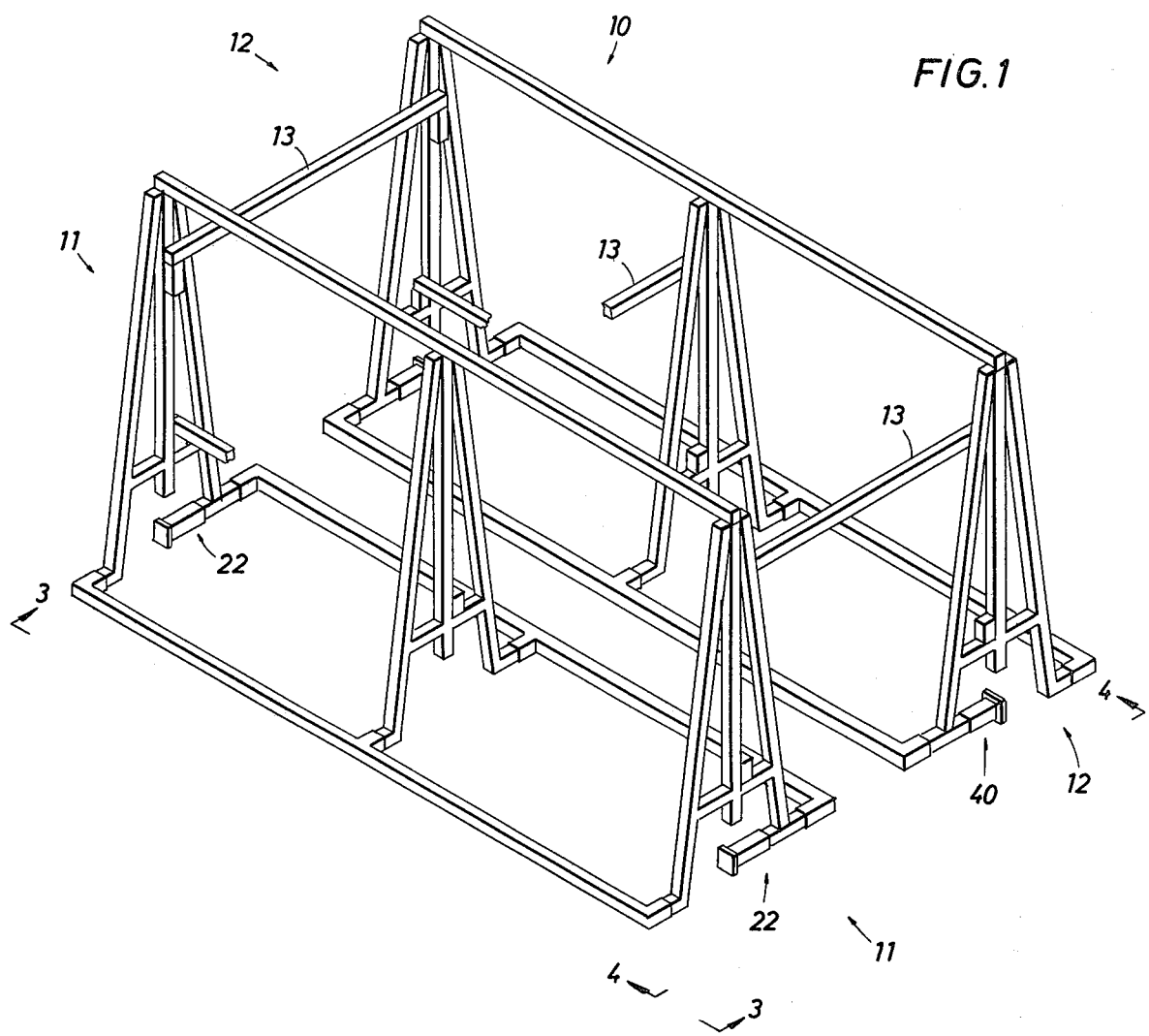
FIG. 1 is a perspective view of an assembled rack prior to installation without any glass shown thereon.

In FIG. 1, the completely assembled glass rack 10 is composed of a first row of upstanding A-frames 11 and a second row of upstanding A-frames 12 connected therebetween by elevated horizontal beams 13. The rows 11 and 12 are similar, and only one will be described. The description can then be extended to the second row.

Figure 4:
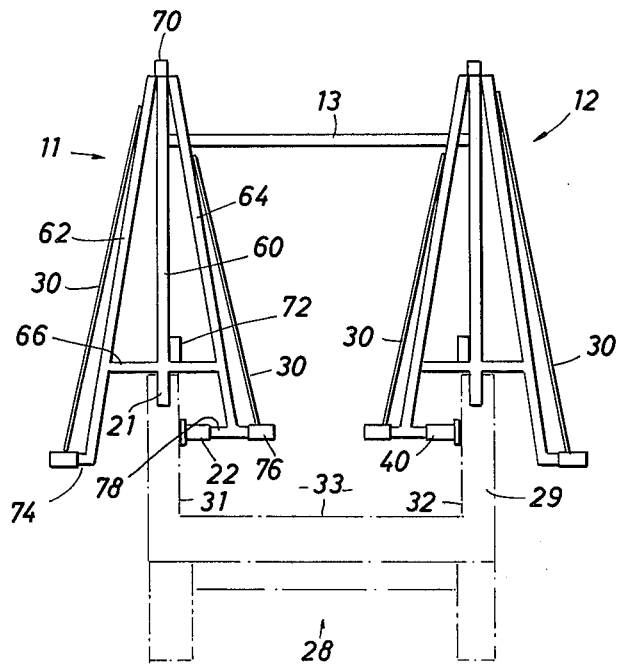
FIG. 4 is a sectional view of the rack taken along the line 4—4 of FIG. 1 showing the rack mounted on a conventional pickup truck with glass resting thereon.
Figure 2:
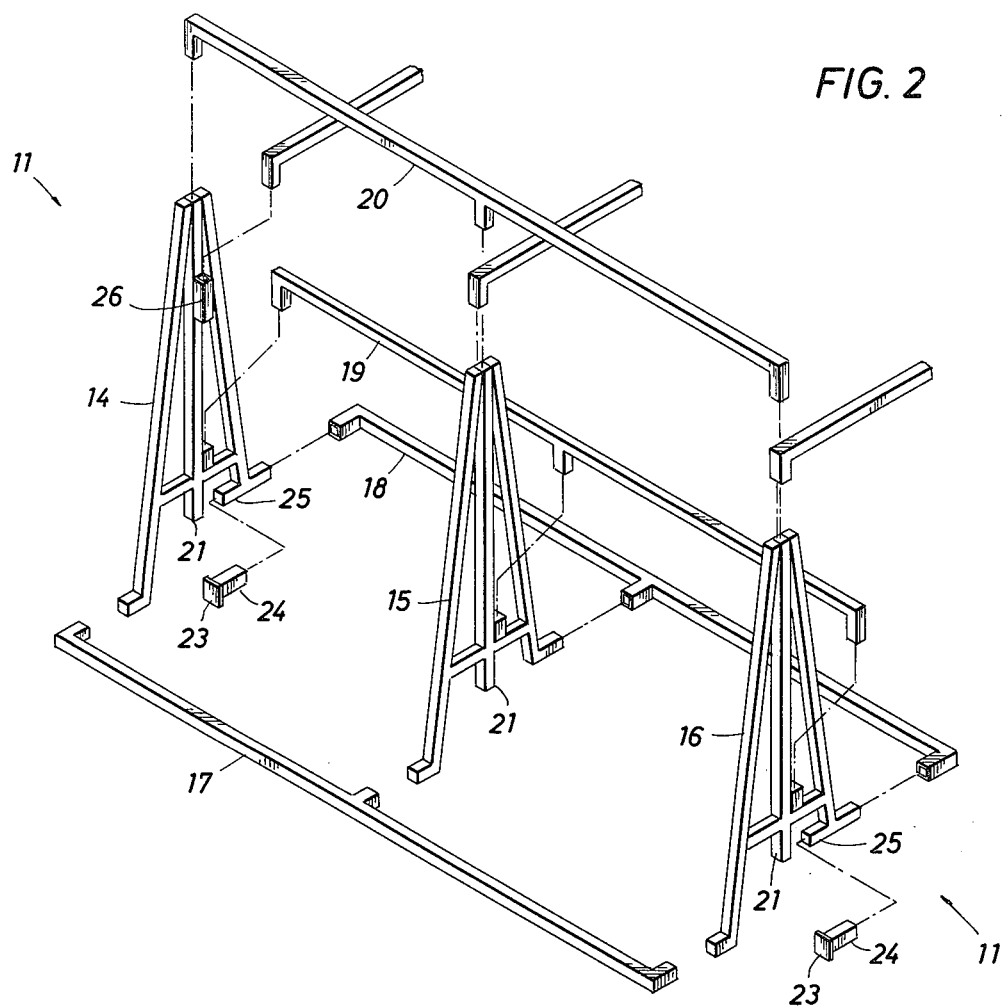
FIG. 2 is an exploded view of one row of A-frames.

In FIG. 2, the first row of upstanding A-frames 11 includes A-frame units 14, 15 and 16. Each A-frame is similar in construction as shown in FIG. 4. This side view of an A-frame reveals a central vertical frame member 60 (see FIG. 4) made of the common stock used in the novel glass rack 10. The vertical piece is centered between a left sloping piece 62 and a right sloping piece 64, the two sloping pieces converging at the apex with approximately equal included angles. The three pieces 60, 62 and 64 are in a single plane, being joined by welding or the like at the top, and are fixed by a connective horizontal brace 66 across the lower portion of the A-frame. In FIG. 4, the left and right legs are different lengths, but they can be equal. This is a scale factor dependent in part on relative truck size and maximum glass sheet size.

Each A-frame is formed of generally rectangular stock and includes a number of open sockets or receptacles. The stock used in construction of the illustrated embodiment enables a type of bayonet connection on stabbing a stub into a receptacle, allowing only a slight clearance to achieve a friction fit. The joinder of stub and receptacle is completed by fastening a cotter pin, bolt or the like through the stub and receptacle.

Viewing the A-frame in FIG. 4, the stub and receptacle combination is incorporated at the following locations. The apex has one such connection at 70. An intermediate height receptacle and socket connection is made at 72. A lower outside connection at 74 is included. A fourth connection 76 is similarly located. A fifth such connection 78 is incorporated.

These A-frames are rigidly connected serially in line to one another by elongate, square tubing members 17, 18, 19 and 20. These elongate, square tubing members are rigidly connected to the A-frames 14, 15 and 16 by removable fasteners such as nuts and bolts or other removable fasteners. The several horizontal tubular members are generally parallel, connect with all the A-frames in a row and extend horizontally to make the structure rigid. Going first to the topmost frame member 20, it will be observed to include several spaced, short stubs extending at right angles and located in a common plane. The four horizontal members 17, 18, 19 and 20 are identical in construction and differ from one another only in location in the assembled rack. The elongate, square tubing member 20 is rigidly connected to A-frames 14, 15 and 16 at the apex thereof by inserting a connective stub at right angles from the elongate member 20 into a matching receptacle member of the A-frames 14, 15 and 16. The tubing member 20 adds rigidity to the row 11 of A-frames. The horizontal member 19 is inserted into a shoe or channel near the base of the A-frames 14, 15 and 16. The elongate tubing 19 is rigidly attached by nuts and bolts or other releasable fastening and helps hold the row of upstanding A-frames in a rigid position. Sloping, side located glass receiving means including elongate, square tubing members 17 and 18 are connected by nuts and bolts or other releasable fastening to the base portion of A-frames 14, 15 and 16. The glass receiving means is constructed and arranged so that the end stub portions thereof slip over and coact with mating receptacles on the A-frames for easy assembly and connection. In achieving assembly, the first row of upstanding A-frames 11 is rigidly and permanently connected one to the other. A-frames 14, 15 and 16 are joined at their apex by the elongate, square tubing member 20 along the mid portion of the frame by elongate, square tubing member 19 and at the bases thereof by glass receiving means 17 and 18.

As described to this juncture, the invention utilizes a minimum number of parts with each part duplicated. The horizontal frame members 17, 18, 19 and 20 are, therefore, identical. The A-frames are identical.

This first row of upstanding A-frames composes one-half of a rack which is symmetrical along a centerline. Each A-frame includes a downwardly directed stub 21 which stabs into or inside of an upwardly facing receptacle in the side of a pickup truck as shown in FIG. 4. The upstanding A-frames 14 and 16 include a horizontally acting alignment means 22 better shown in FIG. 1. The horizontally acting alignment means terminates at a flat face 23 supported on a a telescopic mount 24 which is designed to slip over and coact with a fixed member 25 of A-frames 14 and 16. The same device can be added to the middle A-frame; it is omitted because two are usually adequate.

Figure 3:
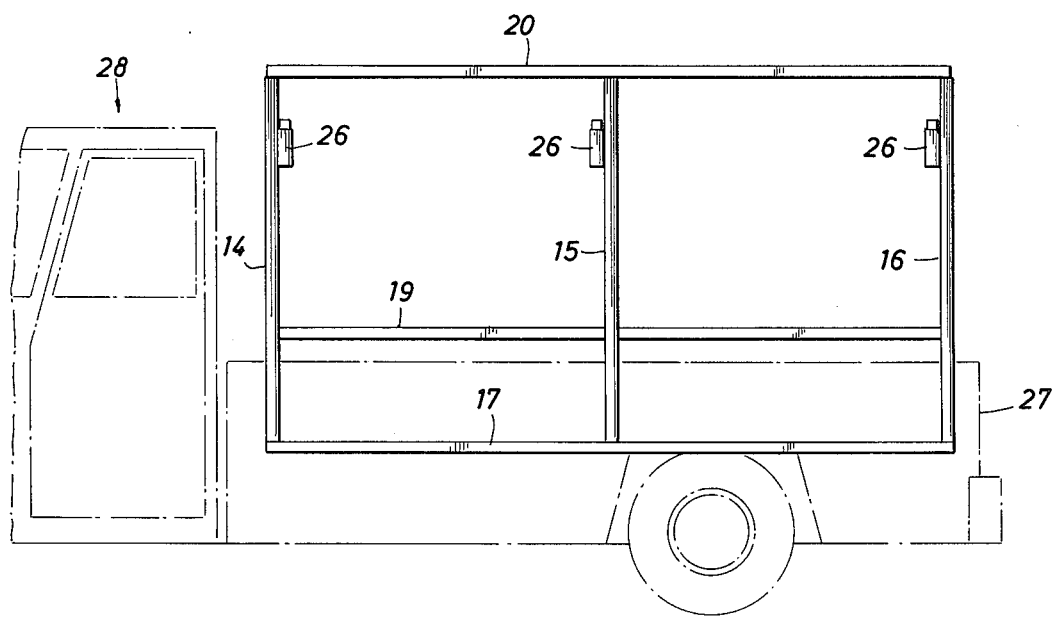
FIG. 3 is a sectional view along the line 3—3 of FIG. 1 showing the rack mounted on a conventional pickup truck.

In FIG. 3, A-frames 14 and 16 are also equipped with a shoe or channel member 26. The shoe 26 is designed to accommodate and coact with the elevated horizontal beam 13 when placed on the pickup truck 28 and finally assembled.

In FIG. 4, a completely assembled first row of upstanding A-frames is easily lifted by two men onto a side panel of the bed 33 of a pickup truck 28. The stub-like frame member 21, sometimes referred to as a stake, is placed into receptacles in the top edge of the side panel 27 of the pickup truck. The second row of upstanding A-frames 12, being symmetrical to the first row of upstanding A-frames 11, is similarly constructed and arranged and then placed on the opposite side panel 29 of the bed 33 of the pickup truck 28. During mounting, the first row 11 and the second row 12 of the upstanding A-frames will stand without support after being placed onto the side panels 27 and 29 of the pickup truck.

The stake 21 is sufficiently long to hold the frames in an upright position during mounting. After the first row 11 and the second row 12 of the A-frames have been placed on the truck, elevated horizontal beams 13 are placed in the shoes 26 and releasably connected with nuts, bolts, cotter keys or similar conventional means. The last step in mounting the frame to the pickup truck 28 is to extend the horizontally acting alignment means or jacks 22 and 40 into contact with the interior walls 31 and 32 of the bed 33 of the pickup truck 28. The flat face 23 is extended on the telescopic mount 24 into firm contact with the interior walls 31 and 32 of the bed 33 of the pickup truck. The movable member 24 is then removably connected in place to the fixed member 25 via nuts, bolts, cotter keys or other conventional means. Glass 30 may be placed on the glass receiving means 17 and 18 on one or both rows of upstanding A-frames. If, for example, glass is loaded on only the first row of upstanding A-frames 11, the heavy weight of the glass 30 is distributed down onto the sidewall of the pickup truck 28 through the stake member 21 and is also distributed upwardly through the first row of A-frames 11 and across to the second row of upstanding A-frames 12 through the elevated horizontal beams 13. The forces are then transmitted down through the second row of upstanding A-frames 12 onto the opposite side panel 29 of the pickup truck and onto the horizontal acting alignment means or jack 40 which balances the weight of the loaded side onto the opposite interior wall 32 and the side panel 29 of the bed 33 of the pickup truck 28. As mentioned before, the device uses a minimum number of identical parts releasably connected to devise a knockdown system. While the various parts are joined together by removable connectors, they can be welded at the sacrifice of later disassembly.

While the foregoing is directed to the preferred embodiment of the present invention, other and further embodiments of the invention may be devised without departing from the basic concept thereof, and the scope thereof is determined by the claims which follow.

I claim:

1. A glass rack apparatus adapted to be removably mounted over side panels of a bed of a pickup truck, said panels including spaced parallel walls and a top wall having receptacles therein, comprising:

(a) a first row of upstanding A-frames formed of frame members removably mounted on the top of a side panel of the bed of the pickup truck;
(b) a second row of upstanding A-frames formed of frame members removably mounted on the top of an opposite side panel of the bed of the pickup truck;
(c) a plurality of horizontally acting alignment means movably and adjustably supporting said first and second row of A-frames, said alignment means being constructed and arranged to engage opposite interior walls of the side panels of the pickup truck;
(d) a plurality of elevated, horizontal beams spanning the space between said first row of A-frames and said second row of A-frames, said beams structurally bracing said first and said second row of A-frames to align said first and second row of A-frames in a generally upright position above the bed of the truck to support the weight of the glass on said first and said second row of A-frames;
(e) glass receiving means connected to said first and second row of said A-frames for receiving and supporting glass placed thereon; and
(f) elongate frame members having a longitudinal dimension, said elongate members including end portions spaced along the longitudinal dimension, said end portions constructed and arranged to coact with and connect to a frame member at the apex of said first and second row of A-frames.

2. The apparatus of claim 1 further including elongate frame members having a longitudinal dimension and shoes attached to a frame member of said first and second row of A-frames, said elongate member including end portions which extend normal to said longitudinal dimension, said end portions constructed and arranged to fit within and connect to said shoes.

3. The apparatus of claim 1 wherein said first and second row of A-frames each include a frame member sized to fit within the receptacles to support and align said first and second row of A-frames relative to these receptacles.

4. The apparatus of claim 3 wherein said horizontally acting alignment means includes an exposed face adapted to be contacted against one of the opposing interior walls of the side panels and including a telescopic mount for said exposed face enabling said face to adjust horizontally toward and contact against an opposing interior wall.

5. The apparatus of claim 4 wherein said telescoping mount comprises a horizontal, relatively fixed frame member and a relatively movable frame member.

6. The apparatus of claim 5 wherein said glass receiving means comprises elongate members having end portions which extend normal to a longitudinal dimension thereof and which are constructed and arranged to relatively slip over and connect to a frame member of said A-frames.

7. The apparatus of claim 2 wherein said elevated horizontal beams have end pieces which extend normal to a longitudinal dimension therof, said beams being constructed and arranged to relatively slip into and connect to said shoes attached to a frame member of said first and second row of A-frames.

* * * * *